United States Patent [19]

Guevarra et al.

[11] Patent Number: 5,059,074
[45] Date of Patent: Oct. 22, 1991

[54] FASTENING ARRANGEMENT

[75] Inventors: Ferdinand A. Guevarra, Chicago; David H. Devonald, III, Glenview, both of Ill.

[73] Assignee: S&C Electric Company, Chicago, Ill.

[21] Appl. No.: 570,105

[22] Filed: Aug. 20, 1990

[51] Int. Cl.$^5$ .................... F16B 37/02; F16B 39/00
[52] U.S. Cl. .................. 411/107; 411/173; 411/400; 411/999; 403/252; 403/254; 29/525.1
[58] Field of Search .............. 411/84, 85, 107, 169, 411/174, 175, 172, 173, 177, 400, 349, 551, 553, 970, 973, 999; 403/252, 263, 254, 255; 29/456, 525.1

[56] References Cited

U.S. PATENT DOCUMENTS

| | | | |
|---|---|---|---|
| 2,302,389 | 11/1942 | Kost | 411/173 |
| 2,745,458 | 5/1956 | Bedford, Jr. | 411/107 |
| 2,781,073 | 2/1957 | Trafton | 411/107 |
| 3,049,369 | 8/1962 | Trafton | 411/107 |
| 4,789,287 | 12/1988 | Le | 411/551 |

*Primary Examiner*—Neill R. Wilson
*Attorney, Agent, or Firm*—James V. Lapacek

[57] ABSTRACT

A fastener arrangement is provided for the clamping together of two objects, such as the adjacent sidewalls of enclosures or the like. The fastener arrangement is used with predetermined aligned openings in the objects to be fastened and is installable from either side of the objects. The fastener arrangement includes a first member insertable through the predetermined aligned openings from either side of the two objects. The first member includes two spaced-apart, facing clamping surfaces. Upon insertion of the first member into the installed position, each of the clamping surfaces engages one of the respective sidewalls. After insertion of the first member, the desired clamping force is applied. In a specific embodiment, the first member carries a threaded stud that extends from the side from which it is installed. A nut is assembled onto the stud to apply the clamping force. The dimensions of the predetermined aligned openings and the fastening arrangement are related so that the first member is easily insertable into the opening, but cannot fall through to the other side. Further, the first member does not need to be held in any way and is both self-supporting and self-aligning during installation and clamping. Thus, assembly merely involves the placing of the first member through the aligned opening, whereupon it is self-guiding into the assembled position, and thereafter applying the clamping force. The arrangement is also easily removable and reusable. Additionally, the first member closes off the opening between the two sides. In a specific embodiment, the predetermined opening is generally T-shaped.

23 Claims, 1 Drawing Sheet

FASTENING ARRANGEMENT

BACKGROUND OF THE INVENTION

1. Field of the Invention

The present invention relates generally to the field of fastening arrangements and, more particularly, to an improved arrangement that facilitates installation from one side, that is self-supporting after insertion, and that does not require the use of special tools during installation.

2. Description of the Related Art

Various fasteners are known, including single-sided installation fasteners also known as "blind" fasteners. Blind fasteners include hollow wall anchors and toggle bolts. Additionally, blind fasteners are described in U.S. Pat. Nos. 4,900,205, 4,765,787, and 3,709,088.

While these arrangements may be generally suitable for their intended use, they are complex in structure, encroach on clearances, require large access space, require special handling tools, are difficult to assemble and install, and/or are not capable of disassembly. Additionally, they are not generally suitable for the clamping together of objects such as the side walls of adjoining enclosures; e.g., bays of switchgear for the electrical power distribution field. In such an application, it is desirable to have relatively large clamping areas. Additionally, due to the presence of components and supports, it is desirable to have a fastening arrangement that does not require the use of special tools or a large access area for installation.

SUMMARY OF THE INVENTION

Accordingly, it is a principal object of the present invention to provide a fastening arrangement for clamping together objects having aligned predetermined openings wherein the fastening arrangement is easily inserted, is self-supporting after insertion, and is affixable without the need for special tools during installation.

It is another object of the present invention to provide a fastening arrangement for the clamping together of two objects with the fastening arrangement being readily installed from one side and also being capable of disassembly at a future time.

It is a further object of the present invention to provide a fastening arrangement for use with objects having predetermined aligned openings for the clamping together of the objects and featuring single-sided installation, large clamping areas, ease of assembly by a simple insertion step, no requirement for special tools or holding of the fastener during installation, the closing off of the openings between the objects after installation, and ease of disassembly from the installed side.

It is yet another object of the present invention to provide a hanger that is adapted to be easily installed in conjunction with a predetermined opening in an object or wall.

These and other objects of the present invention are efficiently achieved by a fastener arrangement for the clamping together of two objects, such as the adjacent sidewalls of enclosures or the like. The fastener arrangement is used with predetermined aligned openings in the objects to be fastened and is installable from either side of the objects. The fastener arrangement includes a first member insertable through the predetermined aligned openings from either side of the two objects. The first member includes two spaced-apart, facing clamping surfaces. Upon insertion of the first member into the installed position, each of the clamping surfaces engages one of the respective sidewalls. After insertion of the first member, the desired clamping force is applied. In a preferred arrangement, the first member includes a generally planar section with an offset so as to define the two facing clamping surfaces. Additionally, the first member carries an element that extends out the side from which it is installed. The element is adapted to cooperate with an assembled fastener to apply the clamping force. In a specific embodiment, the extending element is a threaded stud and the assembled fastener cooperating therewith is a nut. The dimensions of the predetermined aligned openings and the fastening arrangement are related so that the first member is easily insertable into the opening, but cannot fall through to the other side. Further, the first member does not need to be held in any way and is both self-supporting and self-aligning during installation and clamping. Thus, assembly merely involves the placing of the first member through the aligned opening, whereupon it is self-guiding into the assembled position, and thereafter applying the clamping force. The arrangement is also easily removable and reusable. Additionally, the first member closes off the opening between the two sides. In a specific embodiment, the predetermined opening is generally T-shaped.

BRIEF DESCRIPTION OF THE DRAWING

The invention, both as to its organization and method of operation, together with further objects and advantages thereof, will best be understood by reference to the specification taken in conjunction with the accompanying drawing in which.

DETAILED DESCRIPTION

Figure 1:
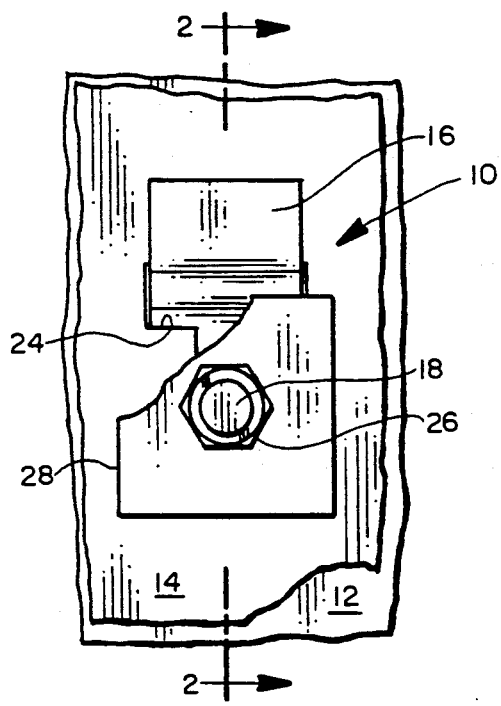
FIG. 1 is a front elevational view of the fastening arrangement of the present invention in an installed position.
Figure 2:
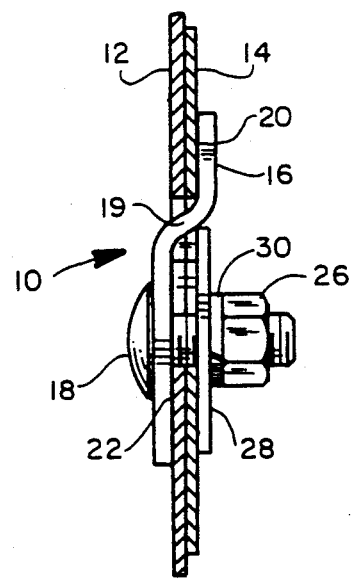
FIG. 2 is a sectional view taken along the line 2—2 of FIG. 1.

Referring to FIG. 1, the present invention Referring now to FIGS. 1 through 4, an illustrative embodiment of the fastening arrangement 10 of the present invention is illustrated in FIGS. 1 and 2 in an installed position for the clamping together of two objects or side walls 12,14. For example, the two side walls 12,14 in one application are adjoining walls of two enclosures or the like. The fastening arrangement 10 includes a first member 16 which carries a first fastener, such as the illustrated carriage bolt 18. The first member 16 via an offset portion 19 defines two spaced-apart clamping surfaces 20,22 (FIG. 3) which contact the respective side walls 14,12, as shown in FIG. 2. The side walls 14,12 include aligned predetermined slots or openings in the shape of a "T", as illustrated by the T-shaped slot 24 of the side wall 14 in FIG. 1.

After the first member 16 with affixed bolt 18 is inserted to the position shown in FIG. 2, a second fastener, e.g. a nut 26, is threaded onto the bolt 18 to apply the desired clamping force to clamp the two side walls 12,14 together. Preferably, and as shown in FIGS. 1 and 2, the fastening arrangement 10 includes a backup or clamping plate 28 which is assembled onto the bolt 18 (via a central aperture, not shown) before the threading of the nut 26. A lock washer 30 is also provided between the clamping plate 28 and the nut 26.

Figure 5:
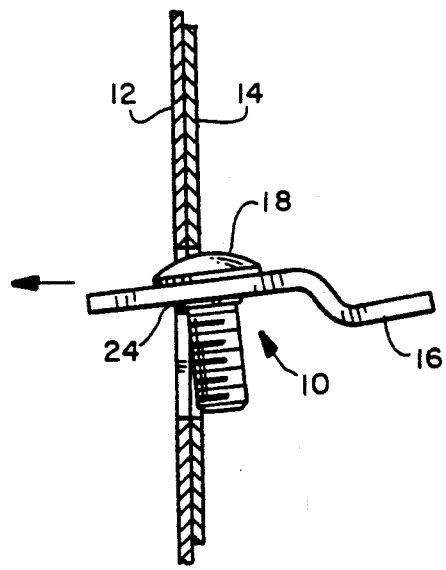
FIGS. 5 and 6 are sectional views similar to FIG. 2, but illustrating the fastening arrangement in various stages of installation.
Figure 6:
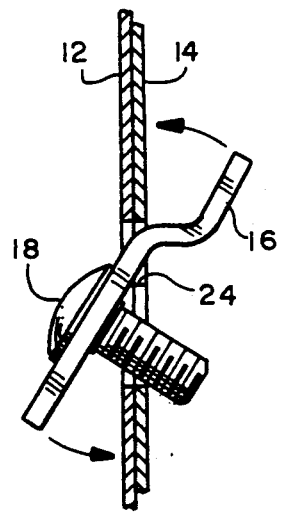
Figure 4:
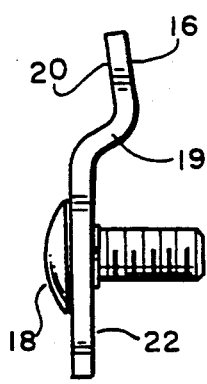
FIG. 4 is a left-side elevational view of the fastener arrangement in FIG. 3.

Installation of the fastening arrangement 10 is further illustrated in FIGS. 5 and 6. Initially, the first member 16 with the affixed bolt 18 is inserted through the top of the T-shaped slot 24 in an approximately horizontal position, with the end of the bolt 18 being allowed to rest in the bottom of the slot 24 (FIG. 5). The first member 16 is then permitted to rotate about the end of the bolt 18 via gravity and/or additional applied insertion force through the position of FIG. 6 to reach the position of FIG. 2. It should be noted that in the orientation of FIGS. 1, 2, 5 and 6, due to the configuration of the first member 16 with the affixed bolt 18, the first member 16 only needs to be placed in the position of FIG. 5 whereupon the first member 16 essentially "falls into place" via the fulcrum point and the center of gravity.

With the first member 16 in the position of FIG. 2, the clamping plate 28, the lock washer 30, and the nut 26 are assembled over the bolt 18. The nut 26 is suitably tightened to provide an appropriate clamping force. It should be noted that after insertion and during the tightening of the nut 26, the first member 16 does not rotate or fall through. It should also be noted that the fastening arrangement 10 covers the T-shaped slot 24, such that there is no free communication between the two sides. Additionally, the fastening arrangement 10 may be installed from either side of the walls 12,14.

If desired, the fastening arrangement 10 may also be readily disassembled by loosening and removal of the nut 26 and removal of the lock washer 30 and the clamping plate 28. Then, the first member 16 with bolt 18 may be tilted or pulled back from the position of FIG. 2 through the sequential positions of FIG. 6 and 5 and withdrawn. Accordingly, the fastening arrangement 10 may be reused to clamp these objects or other objects. It should be noted that it is possible to install the fastening arrangement 10 from either side of the walls 12.14, then disassemble the fastening arrangement 10 and install it from the opposite side.

Concerning the relative dimensions of the T-shaped slot 24 and the fastening arrangement 10, the dimensions of the slot 24 at the top of the "T" must be wide enough to pass the width A of the first member 16 (including any desired tolerances for alignment between the two T-shaped slots of the sidewalls) and high enough to pass the overall thickness of the first member 16, including the extending head portion of the bolt 18. In the illustrative embodiment, the bolt 18 is press fit through an opening 17 of the first member 16. Specifically, the bolt 18 includes tabs 21 and the opening 17 includes cooperating corners 23. In an alternate embodiment, the first member 16 carries a welded stud such that the head of the bolt 18 would not be present. The shank of the "T" must be wide enough to pass the threaded portion of the bolt 18 (again, including any desired tolerances for alignment of the two sidewalls). The length of the lower portion of the "T" must be long enough to accommodate the dimensions from the offset 19 to the lower part of the bolt 18. However, it is preferred that the length of the lower portion of the "T" not be so long as to permit the bolt 18 to pass through the wall entirely when the member 16 is approximately horizontal during insertion. A bolt 18 may be provided that is longer than that as illustrated, such that the nut 26 may be carried during insertion and installation.

Figure 3:
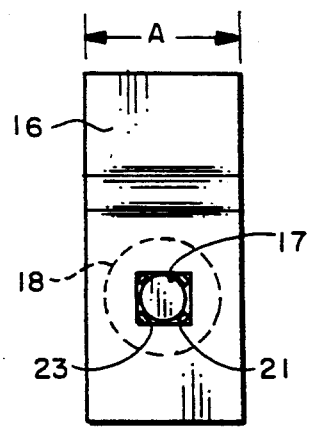
FIG. 3 is a front elevational view of the fastener arrangement of FIGS. 1 and 2 before installation.

Considering other features, it should be noted that the first member 16 is desirably formed or fabricated such that (as shown in FIG. 3) the portion 22 and the portion 20 are not parallel, but are defined as slightly converging planes. The extent of the offset 19 is defined to accommodate the overall thickness of the elements to be clamped, such as the two walls 12,14. Although it would appear to be preferable to form the first member 16 as shown via the offset portion 19, it should be realized that in other specific embodiments, the first member 16 can be otherwise fabricated so as to define the appropriate offsets and the clamping surfaces 20,22. For example, three different portions 19, 20 and 22, could be welded or otherwise assembled from various planar portions.

The width of the first member 16, the dimensions from the offset 19 to the upper end, the dimension from the offset 19 to the bolt 18, and the dimensions from the bolt 18 to the lower end of the first member 16 are determined by the desired clamping areas. In a specific embodiment, the first member 16 is fabricated from 7-gauge steel to permit adequate clamping force.

While there have been illustrated and described various embodiments of the present invention, it will be apparent that various changes and modifications will occur to those skilled in the art. For example, it should also be realized that any plurality of objects can be clamped together as long as each of the objects includes a slot equal to or greater than the aligned dimensions of the T-shaped slot 24. In this regard, the outer two members to be clamped would include the T-shaped slots with any of the intermediate members to be clamped having slots that are greater than or equal to the aligned T-shaped slots. It should also be noted that the fastener arrangement can also be utilized as a hanger to affix or attach objects instead of or in addition to the clamping of two or more members. Thus, the arrangement is operable as in FIG. 1 with the two side walls 12.14 being replaced by a single wall. Further, instead of the threaded stud and nut, other suitable arrangements are possible that are operable after insertion of the first member to apply clamping force to draw the clamping surfaces against the side walls. Accordingly, it is intended in the appended claims to cover all such changes and modifications that fall within the true spirit and scope of the present invention.

What is claimed and desired to be secured by Letters Patent of the United States is:

1. A fastener arrangement for clamping a plurality of objects together, the objects having predetermined aligned openings, the fastening arrangement being insertable from either side of the objects, the fastening arrangement comprising:
 a first member including means for defining two spaced-apart clamping surfaces for clamping opposite sides of the objects when said first member is assembled to the objects;
 a first fastener carried by and extending from said first member; and
 a second fastener for cooperation with said first fastener in an assembled relationship,
 said first member and said first fastener being dimensioned and relatively arranged along with the dimensions of the predetermined aligned openings such that said first member with said first fastener is insertable from either side of the objects such that when said first fastener is inserted from a first side, said first fastener extends from the first side and said two spaced-apart clamping surfaces engage opposite sides of the objects and clamp the opposite sides when said second fastener is assembled with said first fastener, the predetermined aligned openings having a first defined section, the width of the portion of said first member that is inserted being smaller than the width of the first section, the height of the first section being sufficient to allow passage of said first member during insertion, the openings also including a second defined section extending below the first defined section having a width greater than the thickness dimension of said first fastener as measured adjacent said first member and a height for at least a first of the predetermined aligned openings that is less than the length of said first fastener that extends from said first member, the height for the second defined section also being sufficient to permit the insertion of said first member and movement of said first member to a position wherein said two spaced-apart clamping surfaces are positioned so as to be generally parallel to the opposite sides of the objects.

2. The fastener arrangement of claim 1 wherein the first fastener extends from said first member a sufficient distance to prevent said first member with said first fastener from passing completely through the predetermined aligned openings from the first side.

3. The fastener arrangement of claim 1 wherein said two spaced-apart clamping surfaces define two planes that intersect at a predetermined angle.

4. The fastener arrangement of claim 1 wherein said first member includes two planar sections defining said respective two spaced-apart clamping surfaces and an intermediate section, said intermediate section defining a predetermined offset distance between said two planar sections, said offset distance being measured in a direction generally perpendicular to said two planar sections.

5. The fastener arrangement of claim 4 wherein the predetermined aligned opening is generally T-shaped, said first fastener extending from a first of said two planar sections, said first planar section being inserted through the top of the T-shaped predetermined aligned opening with said first fastener engaging the bottom of the T-shaped predetermined aligned opening whereby said first member pivots about said first fastener into an assembled portion.

6. The fastener arrangement of claim 5 wherein said first member with first fastener defines a center of gravity so as to move to said assembled position by gravity after said first member has been manipulated to a predetermined insertion position.

7. The fastener arrangement of claim 4 wherein said predetermined offset distance is defined in terms of the overall thickness of the objects that are to be clamped.

8. The fastener arrangement of claim 7 wherein the predetermined aligned openings are generally T-shaped.

9. The fastener arrangement of claim 1 further comprising a clamping plate that is assembled around said first fastener so as to be clamped against the first side when said second fastener is assembled to said first fastener.

10. A fastener arrangement for clamping a plurality of objects together, the objects having predetermined aligned openings, the fastening arrangement being insertable from either side of the objects, the fastening arrangement comprising:

a first member including means for defining two spaced-apart clamping surfaces for clamping opposite sides of the objects when said first member is assembled to the objects;

a first fastener carried by and extending from said first member; and a second fastener for cooperation with said first fastener in an assembled relationship, said first member and said first fastener being dimensioned and relatively arranged along with the dimensions of the predetermined aligned openings such that said first member with said first fastener is insertable from either side of the objects such that when said first fastener is inserted from a first side, said first fastener extends from the first side and said two spaced-apart clamping surfaces clamp opposite sides of the objects when said second fastener is assembled with said first fastener, said first member including two planar sections defining said respective two spaced-apart clamping surfaces and an intermediate section, said intermediate section defining a predetermined offset distance between said two planar sections, said offset distance being measured in a direction generally perpendicular to said two planar sections, said predetermined offset distance being defined in terms of the overall thickness of the objects that are to be clamped, the predetermined aligned openings being generally T-shaped.

11. The fastener arrangement of claim 10 wherein the height of the slot at the top of the T is defined to be greater than the overall thickness of a first portion of said first member that carries said first fastener, said overall thickness being defined without the portion of said first fastener that extends from said first member and that cooperates with said second fastener.

12. The fastener arrangement of claim 11 wherein the width of the lower portion of the T is defined to be sufficient to pass the thickness of the extending portion of said first fastener.

13. The fastener arrangement of claim 12 wherein the length of the lower portion of the T is long enough to accommodate said first fastener when said first member is inserted to an assembled position.

14. The fastener arrangement of claim 13 wherein said first fastener extends from said first member a sufficient distance relative to the length of the lower portion of the T to prevent the first member from being able to completely pass through from the first side to the other side of the objects.

15. An arrangement for fastening two adjacent sidewalls of two respective enclosures comprising:

predetermined aligned openings in the two adjacent sidewalls; and means for clamping the sidewalls together, said clamping means comprising a first unitary member with no relatively movable parts and having a first portion of predetermined dimensions to coordinate with the predetermined aligned openings so as to be insertable through said predetermined aligned openings from either side of the two sidewalls, said first member including means for defining two spaced-apart clamping surfaces that each engage one of the respective sidewalls in an inserted position, said two spaced-apart clamping surfaces being maintained in the same relative configuration and orientation before and after insertion into said inserted position such that no manipulation between said two spaced-apart clamping surfaces is required to achieve said inserted position, said clamping means and the predetermined aligned openings being relatively dimensioned and including first means for preventing said first member from passing through from one side of the sidewalls to the opposite side and for preventing rotation of said first member after insertion, said clamping means further comprising means operable after insertion of said first member for clamping the two sidewalls between said two spaced-apart clamping surfaces.

16. The arrangement of claim 15 wherein said first member comprises two generally planar portions and an offset portion intermediate said two generally planar portions.

17. The arrangement of claim 16 wherein said two generally planar portions are arranged relative to each other to define two planes intersecting at a predetermined angle.

18. The arrangement of claim 16 wherein the predetermined aligned openings are generally T-shaped.

19. An arrangement for attachment of a device to an object comprising:
   a predetermined opening formed through the object; and
   a device, said device comprising means for clamping opposite sides of the object, said clamping means comprising a first member having a first portion of predetermined dimensions to coordinate with the predetermined opening so as to be insertable through said predetermined opening from a first side of the object, said first member including means for defining two spaced-apart clamping surfaces that each engage a respective side of the object in an inserted position, said first member comprising two generally planar portions that define said two spaced-apart clamping surfaces and an offset portion intermediate said two generally planar portions, said first member being moved into said inserted position with no manipulation between and no change in the relative orientation of said two spaced-apart clamping surfaces, said clamping means further including means extending from said first member and being dimensioned along with the predetermined opening for preventing said first member from completely passing through said object, said clamping means further comprising means operable after insertion of said first member for applying an attachment force between the two sides of the object.

20. A fastener arrangement for clamping a plurality of objects together, the objects having predetermined aligned openings, the fastening arrangement being insertable from either side of the objects, the fastening arrangement comprising:
   a first member including means for defining two spaced-apart clamping surfaces for clamping opposite sides of the objects when said first member is assembled to the objects;
   a first fastener carried by and extending from said first member; and
   a second fastener for cooperation with said first fastener in an assembled relationship,
   said first member and said first fastener being dimensioned and relatively arranged along with the dimensions of the predetermined aligned openings such that said first member with said first fastener is insertable from either side of the objects such that when said first fastener is inserted from a first side said first fastener extends from the first side and said two spaced-apart clamping surfaces clamp opposite sides of the objects when said second fastener is assembled with said first fastener, the predetermined aligned opening is generally T-shaped, said first fastener extending from a first of said two planar sections, said first planar section being inserted through the top of the T-shaped predetermined aligned opening with said first fastener engaging the bottom of the T-shaped predetermined aligned opening whereby said first member pivots about said first fastener into an assembled portion.

21. An arrangement for fastening two adjacent sidewalls of two respective enclosures comprising:
   predetermined aligned openings in the two adjacent sidewalls; and
   means for clamping the sidewalls together, said clamping means comprising a first member having a first portion of predetermined dimensions to coordinate with the predetermined aligned openings so as to be insertable through said predetermined aligned openings from either side of the two sidewalls, said first member including means for defining two spaced-apart clamping surfaces that each engage one of the respective sidewalls, said clamping means further comprising means operable after insertion of said first member for clamping the two sidewalls between said clamping surfaces, said first member comprising two generally planar portions and an offset portion intermediate said two generally planar portions, the predetermined aligned openings being generally T-shaped.

22. A method of clamping two objects together comprising:
   forming predetermined aligned openings in the two objects, the predetermined aligned openings being generally T-shaped;
   inserting a first member having an extending first fastener from a first side of the objects such that the first fastener extends out the first side, the first member including two spaced-apart clamping surfaces for clamping opposite sides of the objects after insertion to an assembled position; and
   assembling a second fastener with the first fastener to apply a clamping force between the two objects.

23. The method of claim 22 wherein the first member with the first fastener defines a predetermined center of gravity, the predetermined center of gravity causing pivoting of the first member in said inserting step to an assembled position after the first member is placed through the predetermined aligned openings to a predetermined insertion position, the first member pivoting about the first fastener at a point at the bottom of the T-shaped predetermined aligned openings.

* * * * *